United States Patent Office 3,745,216
Patented July 10, 1973

3,745,216
COMPOSITIONS AND METHODS FOR PRODUCING HYPOTENSIVE ACTIVITY WITH IMIDAZO AND PYRIMIDO[2,1-b]QUINAZOLINE COMPOUNDS
Timothy Yu-Wen Jen and Bernard Loev, Broomall, Pa., assignors to Smith Kline & French Laboratories, Philadelphia, Pa.
No Drawing. Continuation-in-part of application Ser. No. 886,370, Dec. 18, 1969, now Patent No. 3,621,025. This application Mar. 1, 1971, Ser. No. 120,064
Int. Cl. A61k 27/00
U.S. Cl. 424—251          14 Claims

ABSTRACT OF THE DISCLOSURE

Compositions having hypotensive activity containing imidazo and pyrimido[2,1-b]quinazoline compounds and methods of producing hypotensive activity by administering these compounds.

---

This application is a continuation-in-part of Ser. No. 886,370, filed Dec. 18, 1969, now U.S. Pat. No. 3,621,025.

This invention relates to new pharmaceutical compositions having hypotensive activity and to methods of producing said activity.

The pharmaceutical compositions of this invention comprise, in dosage unit form, a pharmaceutical carrier and an imidazo[2,1-b]quinazoline or pyrimido[2,1-b]quinazoline compound selected from the following formulas:

Formula I 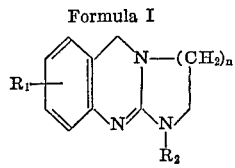   Formula II 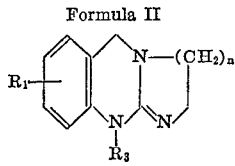

in which:

$R_1$ is hydrogen, halogen, trifluoromethyl, lower alkyl, lower alkoxy, lower alkanoyl, sulfamoyl or hydroxy;
$R_2$ is hydrogen, lower alkyl or lower alkanoyl;
$R_3$ is lower alkyl or lower alkanoyl and
$n$ is 1 or 2 and pharmaceutically acceptable acid addition salts thereof.

Preferred pharmaceutical compositions of this invention contain, as the active ingredient, a compound selected from Formulas I and II in which $R_1$ is hydrogen, chloro, trifluoromethyl or methyl and, in Formula I, $R_2$ is hydrogen, methyl or acetyl and, in Formula II, $R_3$ is methyl or acetyl.

Advantageous pharmaceutical compositions of this invention contain, as the active ingredient, the compound of Formula I in which $R_1$ and $R_2$ are hydrogen and $n$ is 1. This compound, and the other compounds of Formula I in which $R_2$ is hydrogen, may exist in tautomeric forms which are represented by Formula I or by Formula II above in which $R_3$ is hydrogen. Preferably, a pharmaceutically acceptable acid addition salt of this compound, which is 1,2,3,5-tetrahydroimidazo[2,1-b]quinazoline, is the active ingredient in pharmaceutical compositions of this invention, for example preferably 1,2,3,5-tetrahydroimidazo[2,1-b]quinazoline hydrochloride or most preferably 1,2,3,5-tetrahydroimidazo[2,1-b]quinazoline hydrochloride monohydrate.

The terms "lower alkyl" and "lower alkoxy" where used herein denote groups having 1–4 carbon atoms, the terms "lower alkanoyl" denotes groups having 2–4 carbon atoms and the term "halogen" denotes chloro, bromo or fluoro.

The compounds of Formulas I and II are prepared as follows:

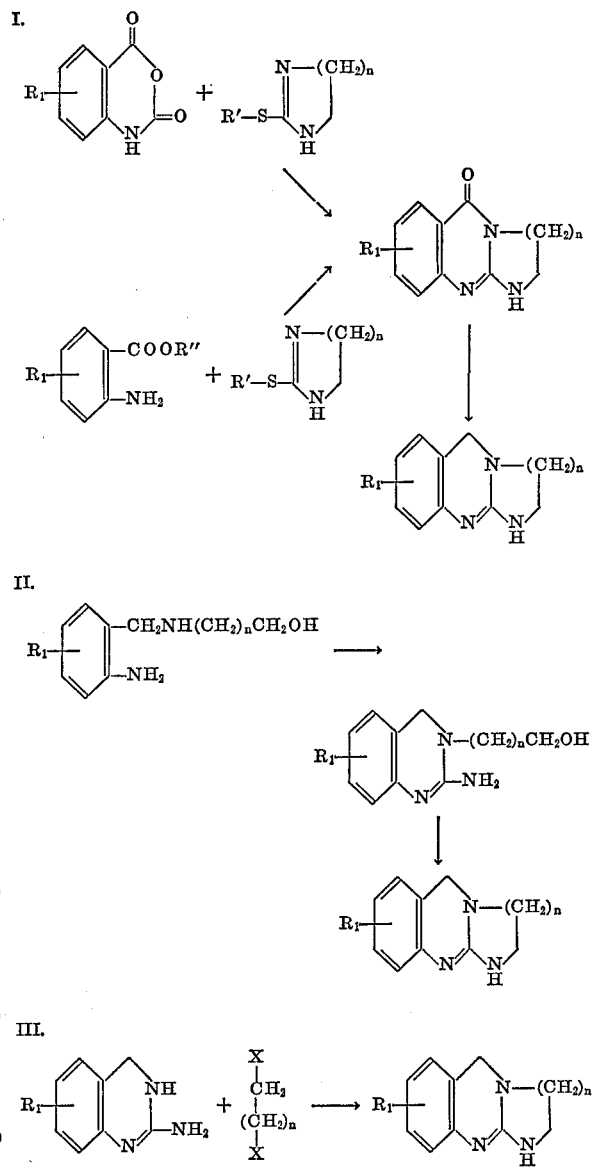

The terms $R_1$ and $n$ are as previously defined, R' is lower alkyl, R" is methyl or ethyl and X is halogen.

According to procedure I above, an isatoic anhydride or a methyl or ethyl anthranilic acid ester is reacted with a 2-lower alkylmercapto-2-imidazoline or -tetrahydropyrimidine to give the imidazo or pyrimido[2,1-b]quinazolinone intermediate, respectively. Reducing this intermediate with, for example, a metallic hydride such as lithium aluminum hydride or a reducing system such as phosphorus pentasulfide and Raney nickel gives the N-unsubstituted imidazo[2,1-b]quinazolines and pyrimido [2,1-b]quinazolines.

The 2-lower alkylmercapto-2-imidazoline and -tetrahydropyrimidine starting materials of procedure I are prepared by reacting a imidazolidine-2-thione or a hexahydropyrimidine-2-thione with a lower alkyl halide.

Alternatively, the imidazo or pyrimidoquinazolinone intermediates of procedure I are prepared by reacting a quinazoline with ethylene glycol or 1,3-propanediol, treating the resulting 2-chloro-4-hydroxyalkoxyquinazoline with thionyl chloride, and reacting the resulting 2-chloro - 3-chloroalkyl-3,4,-dihydroquinazolin-4-one with ammonia.

By procedure II, a 2-(hydroxyalkylaminomethyl) aniline is reacted with a standard reagent to form a guanidine, such as cyanamide or cyanogen bromide, and the resulting 2-amino-3,4-dihydro-3-hydroxyalkylquinazoline is treated with acid to give the N-unsubstituted imidazo and pyrimido[2,1-b]quinazolines.

According to procedure III, a 2-amino-3,4-dihydroquinazoline is reacted with a 1,2-dihaloethane or 1,3-dihalopropane to give the N-unsubstituted imidazo and pyrimido[2,1-b]-quinazolines.

The compounds of Formula I in which $R_2$ is lower alkyl and of Formula II in which $R_3$ is lower alkyl are prepared by procedures I, II and III by using an appropriate N-lower alkyl substituted starting material or intermediate. In procedure I, an N-lower alkyl substituted isatoic anhydride or anthranilic acid ester is used to prepare compounds of Formula II in which $R_3$ is lower alkyl and an N-lower alkyl substituted 2-lower alkylmercapto-2-imidazoline or -tetrahydropyrimidine is used to prepare compounds of Formula I in which $R_2$ is lower alkyl. In procedure II, a N-lower alkyl substituted aniline is used as a starting material to prepare N-lower alkyl compounds of Formula II and a 2-lower alkylamino quinazoline intermediate is used to prepare compounds of Formula I in which $R_2$ is lower alkyl. In procedure III, 2-lower alkylaminoquinazoline is used as a starting material to prepare compounds of Formula I in which $R_2$ is lower alkyl and a 1-lower alkyl-2-iminoquinazoline starting material is used to prepare compounds of Formula II in which $R_3$ is lower alkyl.

The compounds of Formulas I and II in which $R_2$ and $R_3$ are lower alkyl and lower alkanoyl may be prepared by reacting the N-unsubstituted imidazo and pyrimido-[2,1-b]quinazoline with lower alkyl halide to prepare the N-lower alkyl compounds and with a lower alkanoyl halide or a lower alkanoic anhydride to give the N-lower alkanoyl compounds. The 1-lower alkyl and 10(or 11)-lower alkyl compounds prepared by this procedure are separated by fractional recrystallization or chromatography. Similarly, the 1-lower alkanoyl and 10 (or 11)-lower alkanoyl compounds are separated by fractional recrystallization or chromatography.

Alternatively, compounds of Formulas I and II in which $R_1$ is halo, sulfamoyl or lower alkanoyl are prepared from the corresponding compounds in which $R_1$ is hydrogen. The halo substituted imidazo or pyrimidoquinazolines are prepared by reacting the compounds in which $R_1$ is hydrogen with a halogenating agent such as an N-halosuccinimide. Reacting compounds in which $R_1$ is hydrogen with chlorosulfonic acid and treating the resulting chlorosulfonyl substituted compound with ammonia gives the sulfamonyl imidazo and pyrimidoquinazolines. Compounds of Formulas I and II in which $R_1$ is lower alkanoyl are prepared by reacting an imidazo or pyrimidoquinazoline in which $R_1$ is hydrogen with, for example, a lower alkanoyl chloride or lower alkanoic acid anhydride and aluminum chloride.

Compounds in which $R_1$ is hydroxy may be made by cleavage of the corresponding lower alkoxy derivatives by ether cleavage procedures.

The pharmaceutically acceptable acid addition salts of the compounds of Formulas I and II are formed with organic and inorganic acids by methods known to the art. The base is reacted with an organic or inorganic acid in aqueous miscible solvent, such as acetone or ethanol, with isolation of the salt by concentration and cooling or in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The compounds of Formulas I and II may be administered internally in conventional dosage forms by incorporating an appropriate dose of the compound with pharmaceutical carriers according to accepted pharmaceutical practices. The resulting pharmaceutical compositions are objects of this invention.

The pharmaceutical carrier may be, for example, either a solid or liquid. Exemplary of solid carriers are lactose, starch, calcium sulfate, magnesium stearate, terra alba, sucrose, talic, stearic acid, gelatin, agar, pectin or acacia. Exemplarly of liquid carriers are peanut oil, olive oil or sesame oil. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tableted, placed in a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule, a liquid suspension or a sterile suspension or solution for parenteral use.

The compositions of this invention contain an imidazo or pyrimido[2,1-b]quinazoline compound of Formula I or II in an amount of from about 0.1 mg. to about 100 mg., preferably from about 0.1 mg. to about 50 mg., per dosage unit. In preferred compositions of this invention, 1,2,3,5-tetrahydroimidazo[2,1-b]quinazoline, preferably as the hydrochloride salt and most preferably as the hydrochloride monohydrate, is present in an amount of from about 0.1 mg. to about 25 mg., preferably from about 0.1 mg. to about 10 mg., per dosage unit.

One skilled in the art will recognize that in determining the amounts of the active ingredient in the claimed compositions and used in the claimed methods, the activity of the chemical ingredient as well as the size of the host animal must be considered.

The method of producing hypotensive activity in accordance with this invention comprises administering internally to animals an effective but nontoxic amount of an imidazo[2,1-b]quinazoline or pyrimido[2,1-b]quinazoline compound selected from Formula I or II and pharmaceutically acceptable acid addition salts thereof. The active ingredient will preferably be administered in dosage unit form as described above. The route of administration will be orally or parenterally. Preferably, the active ingredient will be administered in a total daily dosage of from about 0.1 mg. to about 200 mg., advantageously from about 0.1 mg. to about 100 mg. Advantageously, 1,2,3,5 - tetrahydroimidazo[2,1 - b]quinazoline, preferably as the hydrochloride salt and most preferably as the hydrochloride monohydrate, will be administered in a total daily dosage of from about 0.1 mg. to about 50 mg., preferably from about 0.1 mg. to about 20 mg. When the administration is carried out as described above, hypotensive activity is produced.

The hypotensive activity of the compounds of Formulas I and II is demonstrated, for example, by administration to metacorticoid hypertensive rats at doses of about 5 to about 80 mg./kg. orally.

The following examples are not limiting but are illustrative of this invention.

EXAMPLE 1

1,2,3,5-tetrahydroimidazo[2,1-b]quinazolin-5-one (9.5 g.) is suspended in 200 ml. of tetrahydrofuran and the suspension is added dropwise to a stirred suspension of 3.88 g. of lithium aluminum hydride in 300 ml. of tetrahydrofuran. The mixture is heated at reflux for about three hours, then cooled. The excess hydride is decomposed by adding 5 ml. of water, 5 ml. of 15% aqueous sodium hydroxide solution and then 15 ml. of water. The mixture is then stirred and filtered and the solid material obtained is extracted with hot tetrahydrofuran. The filtrate and the extract are combined and evaporated to dryness in vacuo. The residue is recrystallized from ethanol to give 1,2,3,5-tetrahydroimidazo[2,1-b]quinazoline.

A stirred suspension of 5 g. of the free base in 100 ml. of methanol is treated with ethereal hydrogen chloride. The mixture is stirred, ether is added and the mixture is filtered. The solid material is recrystallized from ethanol to give 1,2,3,5-tetrahydroimidazo[2,1-b]quinazoline hydrochloride.

EXAMPLE 2

A mixture of 43.5 g. of 5-chloroisatoic anhydride and 29 g. of 2-ethylmercapto-2-imidazoline is heated slowly to 150–170° C. After the gas evolution ceases, the mixture is cooled and recrystallized from ethanol to give 7-chloro-1,2,3,5-tetrahydroimidazo[2,1-b]quinazolin-5-one.

A suspension of 7 g. of 7-chloro-1,2,3,5-tetrahydroimidazo[2,1-b]quinazolin-5-one in 500 ml. of tetrahydrofuran is added slowly to a stirred suspension of 2.48 g. of lithium aluminum hydride in 200 ml. of tetrahydrofuran. The mixture is heated at reflux, then treated with 2.5 ml. of water, 2.5 ml. of 15% aqueous sodium hydroxide solution and then 6.5 ml. of water. The mixture is stirred and filtered. The solid material is extracted with 1.5 l. of boiling methanol. The filtrate and extract are combined and evaporated in vacuo to give as the residue 7-chloro-1,2,3,5-tetrahydroimidazo[2,1-b]quinazoline.

The free base in methanol is stirred with ethereal hydrogen chloride. Adding ether, filtering and recrystallizing from ethanol gives 7-chloro-1,2,3,5-tetrahydroimidazo[2,1-b]quinazoline hydrochloride.

EXAMPLE 3

A solution of 140 mg. of 1,2,3,5-tetrahydroimidazo[2,1-b]quinazoline in 10 ml. of methanol is heated with 1 ml. of methyl iodide in a bomb at 100° C. for 72 hours. The mixture is then concentrated and filtered to give 1-methyl-1,2,3,5-tetrahydroimidazo[2,1-b]quinazoline hydroiodide and 10-methyl-2,3,5,10-tetrahydroimidazo[2,1-b]quinazoline hydroiodide. These hydroiodide salts are dissolved in water and the solution is basified, then extracted with ether. The ether is removed from the extract by evaporating in vacuo to give 1-methyl-1,2,3,5-tetrahydroimidazo[2,1-b]quinazoline and 10-methyl-2,3,5,10-tetrahydroimidazo[2,1-b]quinazoline. These compounds are separated by chromatography on basic alumina.

By the same procedure, using 1.5 ml. of ethyl bromide in place of methyl iodide, the products are 1-ethyl-1,2,3,5-tetrahydroimidazo[2,1-b]quinazoline and 10-ethyl-2,3,5,10-tetrahydroimidazo[2,1-b]quinazoline. These compounds are separated by chromatography.

Using 2.5 ml. of butyl bromide in the above procedure in place of methyl iodide, the products are 1-butyl-1,2,3,5-tetrahydroimidazo[2,1-b]quinazoline and 10-butyl-2,3,5,10-tetrahydroimidazo[2,1-b]quinazoline. These compounds are separated by chromatography.

EXAMPLE 4

One gram of 1,2,3,5-tetrahydroimidazo[2,1-b]quinazoline and 25 ml. of acetic anhydride are heated on a steam bath for 30 minutes. The solid material is filtered off. The filtrate is treated with water, then basified and filtered. The solid material obtained from these two filtrations is combined. This material is 1-acetyl-1,2,3,5-tetrahydroimidazo[2,1-b]quinazoline and 10-acetyl-2,3,5,10-tetrahydroimidazo[2,1-b]quinazoline. These compounds are separated by chromatography on alumina.

EXAMPLE 5

By the procedure of Example 2, using in place of 5-chloroisatoic anhydride the following:

3-chloroisatoic anhydride
4-chloroisatoic anhydride
6-bromoisatoic anhydride
5-fluoroisatoic anhydride
6-trifluoromethylisatoic anhydride
6-methylisatoic anhydride
3-methylisatoic anhydride
6-ethylisatoic anhydride
6-propylisatoic anhydride the following products are obtained, respectively:

9-chloro-1,2,3,5-tetrahydroimidazo[2,1-b]quinazoline
8-chloro-1,2,3,5-tetrahydroimidazo[2,1-b]quinazoline
6-bromo-1,2,3,5-tetrahydroimidazo[2,1-b]quinazoline
7-fluoro-1,2,3,5-tetrahydroimidazo[2,1-b]quinazoline
6-trifluoromethyl-1,2,3,5-tetrahydroimidazo[2,1-b]quinazoline
6-methyl-1,2,3,5-tetrahydroimidazo[2,1-b]quinazoline
9-methyl-1,2,3,5-tetrahydroimidazo[2,1-b]quinazoline
6-ethyl-1,2,3,5-tetrahydroimidazo[2,1-b]quinazoline
6-propyl-1,2,3,5-tetrahydroimidazo[2,1-b]quinazoline.

EXAMPLE 6

By the procedure of Example 4, using propionic anhydride in place of acetic anhydride, the products are 1-propionyl-1,2,3,5-tetrahydroimidazo[2,1-b]quinazoline and 10-propionyl-2,3,5,10-tetrahydroimidazo[2,1-b]quinazoline. These compounds are separated by chromatography.

Also, by the procedure of Example 4, using butyric anhydride in place of acetic anhydride, the products are 1-butyryl-1,2,3,5-tetrahydroimidazo[2,1-b]quinazoline and 10-butyryl-2,3,5,10-tetrahydroimidazo[2,1-b]quinazolne.

EXAMPLE 7

16.7 grams of 3-methoxyanthranilic acid in a mixture of 12 ml. of concentrated hydrochloric acid and 100 ml. of water is treated with a slow stream of phosgene maintaining the temperature at about 50° C. After two hours, the precipitated solid material is collected by filtration, washed with water and recrystallized from ethanol to give 3-methoxyisatoic anhydride.

3-methoxyisatoic anhydride (9.1 g.) is mixed with 6.5 g. of 2-ethylmercapto-2-imidazoline and the mixture is heated to 150–170° C. until the evolution of gas ceases. The solid is extracted with ethanol and the extracts are concentrated, cooled and filtered to give 9-methoxy-1,2,3,5-tetrahydroimidazo[2,1-b]quinazoline-5-one.

Three grams of the above prepared quinazolinone is treated with 1.0 g. of lithium aluminum hydride in refluxing tetrahydrofuran by the procedure of Example 1. After working up as in Example 1, 9-methoxy-1,2,3,5-tetrahydroimidazo[2,1-b]quinazoline is obtained.

The above prepared base is treated wiht ethereal hydrogen chloride to give 9-methoxy-1,2,3,5-tetrahydroimidazo[2,1-b]quinazoline hydrochloride.

EXAMPLE 8

Eight grams of 1,2,3,5-tetrahydroimidazo[2,1-b]quinazoline is mixed with 40 ml. of chlorosulfonic acid previously chilled in an ice bath. The resulting mixture is stirred for 30 minutes and then poured into crushed ice. The solution is carefully neutralized with ammonium hydroxide and the precipitate is filtered off and recrystallized from chloroform to give 7-chlorosulfonyl-1,2,3,5-tetrahydroimidazo[2,1-b]quinazoline.

A solution of 2 g. of the above prepared chlorosulfonyl compound in 100 ml. of chloroform is treated with excess ammonia gas and the mixture is heated in a steel bomb at 100° C. for 30 minutes, then cooled. The precipitate is filtered off and recrystallized from ethanol to give 7 - sulfamoyl - 1,2,3,5 - tetrahydroimidazo[2,1 - b]quinazoline.

EXAMPLE 9

To a stirred solution of 5 g. of 9-methoxy-1,2,3,5-tetrahydroimidazo[2,1-b]quinazoline, prepared as in Example 7, in 100 ml. of methylene chloride at 0° C. is added dropwise 10 g. of boron tribromide. The resulting mixture is stirred at 25° C. for three hours, 50 ml. of methanol is added and the solution is concentrated and diluted with 10% aqueous sodium bicarbonate solution. The precipitated solid is recrystallized from isopropanol to give 9-hydroxy-1,2,3,5 - tetrahydroimidazo[2,1-b]quinazoline.

EXAMPLE 10

5-n-butylanthranilic acid (19.3 g.) in a mixture of 12 ml. of concentrated hydrochloric acid and 100 ml. of water is treated with phosgene by the procedure described in Example 7. After working up by the procedure of Example 7, 5-n-butylisatoic anhydride is obtained.

5-n-butylisatoic anhydride (10.9 g.) is heated with 6.5 g. of 2-ethylmercapto-2-imidazoline by the procedure of Example 2. After working up by the procedure of Example 2 and recrystallizing from ethanol, 7-butyl-1,2,3,5-tetrahydroimidazo[2,1-b]quinazolin-5-one is obtained.

The above prepared quinazolin-5-one is reduced to 7-butyl-1,2,3,5 - tetrahydroimidazo[2,1-b]quinazoline using lithium aluminum hydride by the procedure described in Example 1.

EXAMPLE 11

To a solution of 90 g. of chloral hydrate in 1200 ml. of water, 1300 g. of sodium sulfate and a solution of 82.5 g. of p-butoxyaniline in 300 ml. of water and 43 ml. of concentrated hydrochloric acid are added. Hydroxylamine hydrochloride (110 g.) in 500 ml. of water is added and the mixture is quickly heated to vigorous boiling. The boiling is continued for about 10 minutes. After cooling, N-(p-butoxyphenyl) - α-hydroxyiminoacetamide crystallizes and is filtered off.

The above prepared acetamide compound (100 g.) is added in portions with stirring to 300 ml. of concentrated sulfuric acid (prewarmed to 50°) at a rate so as to keep the temperature between 60–70° C. The reaction mixture is then heated to 80° C. for 10 minutes, then cooled and poured into an ice bath. The precipitate is filtered off and washed with water to give 5-butoxyisatin.

To a stirring solution of 60 g. of 5-butoxyisatin in 600 ml. of glacial acetic acid cooled in an ice batth is added 150 g. of chromium trioxide in portions so as to keep the temperature between 10–15° C. The stirring is continued for 12 hours at 15° C., 1.5 hours at 40° C. and one hour at 75° C. The mixture is cooled and then poured into an ice-water mixture. The precipitate is filtered off and washed well with water to give 5-butoxyisatoic anhydride.

5-butoxyisatoic anhydride (23.5 g.) and 13 g. of 2-ethylmercapto-2-imidazoline are heated together by the procedure of Example 2 to give 7-butoxy-1,2,3,5-tetrahydroimidazo[2,1-b]quinazolin-5-one.

The above prepared quinazolinone is treated with lithium aluminum hydride by the procedure of Example 1 to give 7-butoxy-1,2,3,5-tetrahydroimidazo[2,1-b]quinazoline.

The corresponding hydrochloride salt is prepared by treating the free base with ethereal hydrogen chloride in methanol.

EXAMPLE 12

Ten grams of 1,2,3,4-tetrahydro-6H-pyrimido[2,1-b]quinazolin-6-one is treated with lithium aluminum hydride in ether by the procedure of Example 1 to give 1,2,3,4-tetrahydro-6H-pyrimido[2,1-b]quinazoline.

The corresponding hydrochloride salt is formed by treating the free base in methanol with ethereal hydrogen chloride.

EXAMPLE 13

Five grams of 1 - methyl-1,2,3,5-tetrahydroimidazo[2,1-b]quinazolin-5-one is treated with 2 g. lithium aluminum hydride in tetrahydrofuran by the procedure of Example 1 to give 1-methyl-1,2,3,5-tetrahydroimidazo[2,1-b]quinazoline.

Treating the above prepared compound with ethereal hydrogen chloride gives 1-methyl-1,2,3,5-tetrahydroimidazo[2,1-b]quinazoline hydrochloride.

EXAMPLE 14

2,4,6-trichloroquinazoline (28 g.) and 19 g. of 1,3-propanediol are boiled in 350 ml. of acetone for four hours with 35 g. of potassium carbonate. Water is added and the precipitate is filtered off to give 2,6-dichloro-4-(3-hydroxypropoxy)quinazoline which is recrystallized from benzene.

Ten grams of 2,6-dichloro-4-(3-hydroxypropoxy)quinazoline is boiled with 60 ml. of thionyl chloride for one hour and then poured onto ice. The precipitate is filtered off to give 2,6-dichloro-3-(3-chloropropyl)-3,4-dihydroquinazolin-4-one which is recrystallized from petroleum ether.

Three grams of the above prepared quinazolinone is heated with 25 ml. of ethanolic ammonia in a steel bomb at 80° C. for one hour. The solvent is then removed and the residue is washed with water and recrystallized from ethanol to give 8-chloro-1,2,3,4-tetrahydro-6H-pyrimido[2,1-b]quinazolin-6-one.

Treating the above prepared quinazolinone with lithium aluminum hydride in tetrahydrofuran by the procedure of Example 1 gives 8-chloro-1,2,3,4-tetrahydro-6H-pyrimido[2,1-b]quinazoline.

EXAMPLE 15

1,2,3,5-tetrahydroimidazo[2,1-b]quinazoline, prepared as in Example 1, in ethanol is treated with 1.1 equivalents of fumaric acid. The mixture is warmed on a steam bath for five minutes, then evaporated to dryness in vacuo. The residue is recrystallized from isopropanol to give 1,2,3,5-tetrahydroimidazo[2,1-b]quinazoline fumarate.

Similarly, using maleic acid in the above procedure, the maleate salt of 1,2,3,5-tetrahydroimidazo[2,1-b]quinazoline is prepared.

Treating 1,2,3,5 - tetrahydroimidazo[2,1-b]quinazoline with a slight excess of glacial acetic acid, then adding ether and filtering gives the acetate salt of 1,2,3,5-tetrahydroimidazo[2,1-b]quinazoline.

EXAMPLE 16

| Ingredients: | Amounts, mg. |
|---|---|
| 1,2,3,5 - tetrahydroimidazo[2,1 - b]quinazoline hydrochloride monohydrate | [1] 0.657 |
| Microcrystalline cellulose, N.F. | 65 |
| Lactose, spray dried | 80 |
| Calcium sulfate dihydrate | 103.093 |
| Magnesium stearate, U.S.P. | 1.25 |

[1] Equivalent to 0.5 mg. of 1,2,3,5-tetrahydroimidazo[2,1-b] quinazoline.

The magnesium stearate is passed through a #60 U.S. standard mesh screen. All of the ingredients are thoroughly mixed and passed through a #30 U.S. standard mesh screen. The mixture is then compressed into a tablet.

EXAMPLE 17

Ingredients:  Amounts, mg.
- 1,2,3,5 - tetrahydroimidazo[2,1 - b]quinazoline hydrochloride monohydrate _____ [1] 6.57
- Microcrystalline cellulose, N.F. _____ 50
- Starch _____ 25
- Calcium sulfate dihydrate _____ 100.83
- Magnesium stearate, U.S.P. _____ 3.80
- Sodium lauryl sulfate, U.S.P. _____ 3.80

[1] Equivalent to 5.0 mg. of 1,2,3,5-tetrahoydroimidazo[2,1-b]quinazoline.

The magnesium stearate is passed through a #60 U.S. standard mesh screen. All of the ingredients are thoroughly mixed and passed through a #30 U.S. standard mesh screen. The mixture is then filled into a hard gelatin capsule.

A capsule, prepared as described above, is administered to a hypertensive subject.

EXAMPLE 18

Ingredients:  Amounts, mg.
- 1,2,3,4 - tetrahydro - 6H - pyrimido[2,1-b]quinazoline hydrochloride _____ 15
- Peanut oil _____ 150

The ingredients are mixed into a slurry and filled into a soft gelatin capsule.

What is claimed is:

1. A pharmaceutical composition, in dosage unit form, for internal administration to produce hypotensive activity comprising a pharmaceutical carrier and an effective hypotensive amount of an imidazo[2,1-b]quinazoline or pyrimido[2,1-b]quinazoline compound selected from the following formulas:

FORMULA I 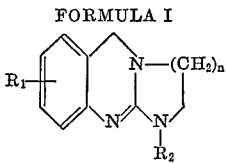  FORMULA II 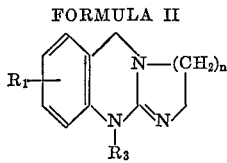

in which:
$R_1$ is hydrogen, halogen, trifluoromethyl, lower alkyl, lower alkoxy, lower alkanoyl, sulfamoyl or hydroxy;
$R_2$ is hydrogen, lower alkyl or lower alkanoyl;
$R_3$ is lower alkyl or lower alkanoyl and
$n$ is 1 or 2
and a pharmaceutically acceptable acid addition salt thereof.

2. A pharmaceutical composition of claim 1 in which the imidazo[2,1-b]quinazoline or pyrimido[2,1-b]quinazoline compound is present in an amount of from about 0.1 mg. to about 100 mg.

3. A pharmaceutical composition of claim 1 in which the imidazo[2,1-b]quinazoline or pyrimido[2,1-b]quinazoline compound is present in an amount of from about 0.1 mg. to about 50 mg.

4. A pharmaceutical composition of claim 1 in which $R_1$ is hydrogen, chloro, trifluoromethyl or methyl and, in Formula I, $R_2$ is hydrogen, methyl or acetyl and, in Formula II, $R_3$ is methyl or acetyl.

5. A pharmaceutical composition of claim 1 containing an imidazo[2,1-b]quinazoline compound of Formula I in which $R_1$ and $R_2$ are hydrogen and $n$ is 1.

6. A pharmaceutical composition of claim 1 containing 1,2,3,5 - tetrahydroimidazo[2,1-b]quinazoline hydrochloride.

7. A pharmaceutical composition, in dosage unit form, for internal administration to produce hypotensive activity comprising a pharmaceutical carrier and an effective hypotensive amount of 1,2,3,5-tetrahydroimidazo[2,1-b]quinazoline hydrochloride monohydrate.

8. A method of producing hypotensive activity which comprises administering internally to an animal an effective but nontoxic amount of an imidazo[2,1-b]quinazoline or pyrimido[2,1-b]quinazoline compound selected from the following formulas:

FORMULA I 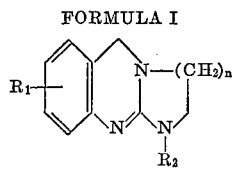  FORMULA II 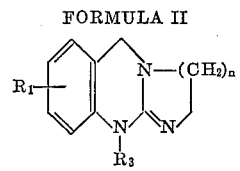

in which:
$R_1$ is hydrogen, halogen, trifluoromethyl, lower alkyl, lower alkoxy, lower alkanoyl, sulfamoyl or hydroxy;
$R_2$ is hydrogen, lower alkyl or lower alkanoyl;
$R_3$ is lower alkyl or lower alkanoyl and
$n$ is 1 or 2
and a pharmaceutically acceptable acid addition salt thereof.

9. A method of claim 8 in which the imidazo[2,1-b]quinazoline or pyrimido[2,1-b]quinazoline compound is administered in a daily dosage of from about 0.1 mg. to about 200 mg.

10. A method of claim 8 in which the imidazo[2,1-b]quinazoline or pyrimido[2,1-b]quinazoline compound is administered in a daily dosage of from about 0.1 mg. to about 100 mg.

11. A method of claim 8 in which $R_1$ is hydrogen, chloro, trifluoromethyl or methyl and, in Formula I, $R_2$ is hydrogen, methyl or acetyl and, in Formula II, $R_3$ is methyl or acetyl.

12. A method of claim 8 in which an imidazo[2,1-b]quinazoline compound of Formula I in which $R_1$ and $R_2$ are hydrogen and $n$ is 1 is administered.

13. A method of claim 8 in which 1,2,3,5-tetrahydroimidazo[2,1-b]quinazoline hydrochloride is administered.

14. A method of producing hypotensive activity which comprises administering internally to an animal an effective but nontoxic amount of 1,2,3,5-tetrahydroimidazo[2,1-b]quinazoline hydrochloride monohydrate.

References Cited
UNITED STATES PATENTS
3,257,401   6/1960   Wagner _____ 260—256.4 F STANLEY J. FRIEDMAN, Primary Examiner